United States Patent

Speckman

[11] Patent Number: 6,027,673
[45] Date of Patent: Feb. 22, 2000

[54] METHOD OF MAKING INDIUM OXIDE MICROSPHERES FOR ANTISTATIC COATINGS

[75] Inventor: Donna Maria Speckman, Los Angeles, Calif.

[73] Assignee: The Aerospace Corporation, El Segundo, Calif.

[21] Appl. No.: 08/899,493

[22] Filed: Jul. 19, 1997

Related U.S. Application Data

[63] Continuation of application No. 08/560,773, Nov. 21, 1995, abandoned.

[51] Int. Cl.[7] .................. B05D 7/00; B29B 9/00
[52] U.S. Cl. ............. 264/7; 427/212; 427/220; 427/221; 427/384; 427/385.5; 264/9; 264/12
[58] Field of Search .................... 427/212, 220, 427/221, 384, 385.5; 264/7, 9, 12

[56] References Cited

U.S. PATENT DOCUMENTS

| | | | |
|---|---|---|---|
| 3,840,391 | 10/1974 | Spitz et al. | 427/248.1 |
| 4,023,961 | 5/1977 | Douglas et al. | 75/355 |
| 5,071,800 | 12/1991 | Iwamoto et al. | 501/126 |

OTHER PUBLICATIONS

Johnson Matthey Material Safety Data Sheets for Indium Acetate, pp 1–3, May 1989.

Verdin and Duck, "Conductive Coatings to Minimise the Electrostatic Charging of Kapton", Proc. Third European Symposium on Spacecraft Materials in Space Environment, Nov. 1985.

Habeeb and Tuck, "Co–ordination Compounds of Imdium. Part XXI. Some Compounds Derived from Indium (III) Acetate, include Indium Diacetate", No date.

"Conductive Coatings to Minimize the Electrostatic Charging of Kapton", Verdin, D. and Duck, M. J. Proceedings of the Third European Symposium on Spacecraft Materials in Space Environment, pp 125–130, Oct. 1985.

"Texture Evolution of SnO2 Synthesized by Pyrolysis of an Aerosol" Vallet–Regi, M., Ragel, V. Roman, J. Martinez, J.L., Labeau, M. Gonzalez–Calbet, J.M. J. Mater. Res. vol. 8. No. 1, pp 138–144, Jan. 1993.

"Co–ordination Compounds of Indium, Part XXI, Some Compounds Derived from Indium (III) Acetate, including Indium Diacetate" Habeeb, J.J, Tuck, D.G. pp. 243–247. 1973 (no month available).

*Primary Examiner*—Shrive Beck
*Assistant Examiner*—Bret Chen
*Attorney, Agent, or Firm*—Derrick Michael Reid

[57] ABSTRACT

Non agglomerating hollow sub-micron size, 0.5 to 2.0 um, indium oxide microspheres are produced using an aerosol pyrolysis method using an indium compound, preferably, an indium acetate precursor, which is dissolved in water, without the use of chlorine or other dangerous chemicals, to generate an indium constituent such as, acetate dihydroxy indium (III), formed in droplets which, when heated by furnace temperatures of 650–700° C., form the indium oxide microspheres particles suitable for polymer loading as a polyimide matrix particularly useful as antistatic coatings.

10 Claims, 1 Drawing Sheet

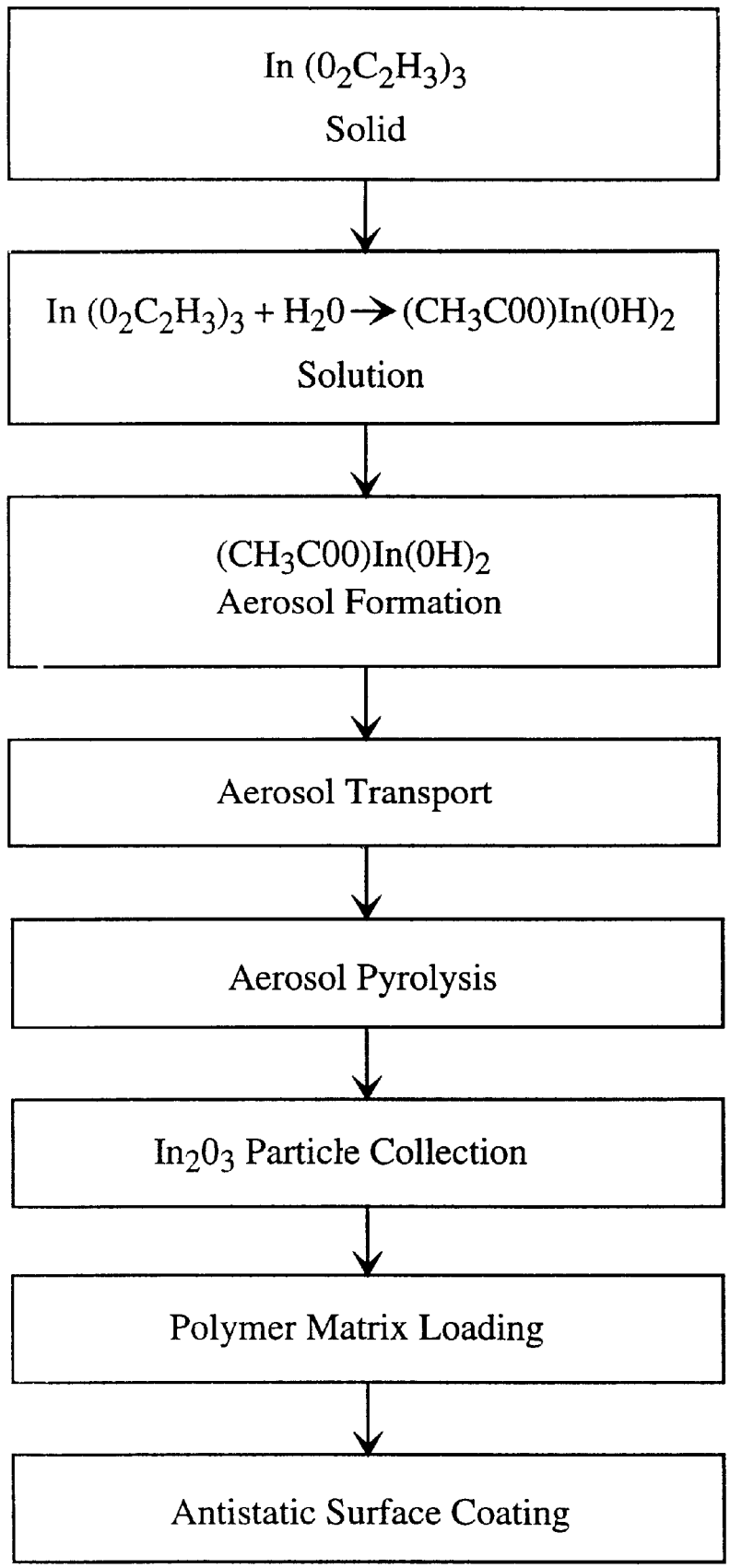

METHOD OF MAKING INDIUM OXIDE MICROSPHERES FOR ANTISTATIC COATINGS

REFERENCE TO RELATED APPLICATION

The application is a CON of applicant's application filed Nov. 21, 1995, Ser. No. 08/560,773, now abandoned, entitled "Method of Making Indium Microspheres for Antistatic Coatings."

STATEMENT OF GOVERNMENT INTEREST

The invention was made with Government support under Contract No. F04701-93-C-0094 by the Department of the Air Force. The Government has certain rights in the invention.

The invention described herein may be manufactured and used by and for the government of the United States for governmental purpose without payment of royalty therefor.

FIELD OF INVENTION

The present invention relates to the formation of micro particles. More specifically, the present invention relates to the formation of indium oxide microspheres particularly suitable for polymer loading for use as antistatic coatings.

BACKGROUND OF THE INVENTION

Transparent, conductive thin films have use as anti-static coatings for television screens, plastics windows, and storage vessels for semiconductor wafers. These thin, transparent, conductive metal oxide coatings have other applications, including antistatic coatings for thermal control dielectric materials on the external surfaces of satellites. Sputtering, chemical vapor deposition and evaporation methods have been used to make these films. These films may also be prepared by dispersing a fine conductive metal oxide powder with desirable optical properties in a polymer binder.

Differential charging can occur on satellite surfaces between dielectric materials of differing properties, and between dielectric and conductive materials. In geosynchronous orbits, these differential voltages can become sufficiently high to cause electrostatic discharges between the materials, and these discharges can both damage electronic circuits and degrade the optical properties of thermal control surfaces. Many thermal control coatings, which are used for passive temperature control of satellite surfaces, contain surface dielectrics such as Kapton or Teflon, and are hence subject to electrostatic discharge problems. Among the approaches used to dissipate surface charging and prevent electrostatic discharges is the application of a thin conductive coating to dielectric surfaces. Such films must be capable of reducing static charge build-up without compromising the thermo-optical properties of the underlying film. Typically, thin, transparent, conductive metal oxide coatings such as indium tin oxide have been used for these antistatic coatings. However, problems with coating adhesion, cracking and peeling of the films during thermal cycling, and penetration by electrons through the thin film to produce trapped charges can reduce the effectiveness of these films as antistatic coatings. These thin films of conductive oxides as spacecraft antistatic coatings have poor adhesion to the Kapton substrates, resulting in cracking and peeling and subsequent loss of conductivity in these films. These problems can be avoided by developing an improved coating technology in which finely dispersed conductive oxide particles are incorporated directly into a suitable polymer matrix to produce flexible, stable antistatic films with suitable thermo-optical properties. Such films could either serve as electrostatic discharge coatings or as a multi-functional thermal control and electrostatic discharge film. In order to successfully develop such a coating, the conductive oxide particles to be incorporated into the polymer matrix must be sufficiently small to remain dispersed in the desired monomer precursor prior to curing of the polymer. Successful dispersion into a polymer matrix requires that the oxide particles be of micron or sub-micron size and not agglomerated.

Indium oxide is an intrinsically semiconducting material that becomes conductive when slightly oxygen deficient, suitable for antistatic coatings. Indium Oxide in a polymer matrix has been used in antistatic coatings. Indium oxide exhibits both the optical and electrical properties necessary for use in these transparent conductive coatings, but is not often used for these applications due to problems with successful dispersion of commercial indium oxide into the polymer binder. Commercial indium oxide powder tends to agglomerate, preventing suitable dispersement in the polymer binder, even when using powerful mechanical mixing techniques such as ball-milling.

The smaller the indium oxide particle size, the better the particles are distributed and suspended in the polymer matrix. Smaller indium oxide particle sizes improve the antistatic properties of the antistatic coatings. Ball milling methods have been used for generating small size indium oxide particles for suspension in a polyimide matrix for antistatic coatings. However, the ball-milling technique is time-consuming and not particularly effective in producing fine, non-agglomerated indium oxide particles. Consequently, there is a need for improved techniques to produce smaller size indium oxide particles suitable for polymer loading.

Ball milling processes have been used on commercial indium tin oxide powder to form particle sizes in the order of 50–500 microns with limited effectiveness in terms of loading and distribution in the soluble polyimide. Sol-gel chemistry has shown that oxides can be prepared in particle sizes from 10 to 100 times smaller than that obtained by ball milling. This particle size distribution would allow better dispersion. Sol gel has not been used to form indium oxide particles. The sol-gel process disadvantageously requires the formation and use of complex intermediate gel phase.

Another technique for generating small size particles is aerosol pyrolysis. Aerosol pyrolysis is a process in which a precursor-containing solution is atomized into droplets. The droplets are transported to a heated region such as in a furnace, for solvent evaporation and precursor decomposition into the desired product. Particles produced by aerosol pyrolysis are typically spherical and uniform in size and composition because the pyrolysis reaction to generate a particle occurs within each self-contained droplet. The size of each generated product particle is determined by the size of the aerosol droplet and by the concentration of precursor within each droplet.

Aerosol pyrolysis has been used to generate small size tin oxide particles using tin-chloride, $SnCl_2$, oxalic acid, $C_2O_4H_2$, and an ammonium hydroxide, $NH_4OH$, pH modifier in water. An aerosol is formed from this solution. The aerosol is then subjected to oxygen and burned to produce the tin oxide, $SnO_2$, particles. One disadvantage of this aerosol pyrolysis method is the use of a chloride which is corrosive and undesirable in general chemical production.

Indium acetate, as a solid compound, is known to generate, when pyrolyzed, large size oxide particles which are disadvantageous in antistatic polymer coatings. This and other disadvantages are solved or reduced using the present invention.

SUMMARY OF THE INVENTION

An object of the present invention is to provide a method for producing small size particles of indium oxide.

Another object of the present invention is to provide small size indium oxide particles suitable for loading in a polymer matrix.

Yet another object of the present invention is to provide polymer matrix loaded with suspended small size particles of indium oxide for use as an antistatic coating.

The present invention uses an aerosol pyrolysis method for generating small particle size indium oxide particles particularly suitable for suspension in a polyimide coating as an improved antistatic coating. Indium acetate is water soluble and used for aerosol pyrolysis to generate $In_2O_3$ microspheres. Indium Acetate alone dissolved in water, generates acetate dihydroxy indium $(CH_3COO)In(OH)_2$. Acetate dihydroxy indium is well suited for aerosol formation and that when pyrolyzed, produces small size microparticles of indium oxide well suited for polymer loading of antistatic coatings for exposed surfaces. These and other advantages will become more apparent in the following detailed description of the preferred embodiment.

BRIEF DESCRIPTION OF THE DRAWING

The drawing is a flow diagram of a method for forming small size particles of indium oxide in a polyimide coating.

DETAILED DESCRIPTION OF THE PREFERRED EMBODIMENT

Referring the drawing, indium acetate, $In(O_2C_2H_3)_3$, is dissolved in water, $H_2O$, to form a solution comprising acetate dihydroxy indium (III), $(CH_3COO)In(OH)_2$ for generating an indium based aerosol which is burned to form small size non-agglomerating indium oxide particles well suited for loading in a polymer coating. No chlorine precursors are used for improved safety, high purity, and low corrosivity. This aerosol pyrolysis method produces spherical, micron-sized indium oxide particles suitable for dispersion in a polymer matrix. A micron-level droplet size results in small indium oxide particle sizes providing an indium oxide product that can be easily dispersed in the polymer matrix.

The non-agglomerating indium oxide microspheres have diameters ranging form 0.5–2.0 um when using this aerosol spray pyrolysis method. The precursor solution used to generate the aerosol droplets for pyrolysis consists of indium acetate dissolved in water. However, the actual indium species present in solution is a hydrolysis product, acetate dihydroxy indium. Thermogravimetric analyses of commercial indium acetate and of pure crystals of the acetate dihydroxy indium compound both demonstrated clean solid-state pyrolyses to generate pure indium oxide particles as confirmed by x-ray diffraction and infrared spectroscopic analysis. Air may be used as the carrier gas for aerosol droplet transport providing oxygen during pyrolysis. Pyrolysis may take place within a tube furnace. The microspheres may be characterized by x-ray diffraction and scanning electron microscopy. The non-agglomerating characteristics of the microspheres, combined with small micron sizes, result in particles that are well suited for dispersion within the polymer matrix required for polymer-based antistatic coatings, which preferably are polyimide based antistatic coatings.

Indium acetate, $In(OOCCH_3)_3$, is used as an indium oxide aerosol precursor. The precursor is soluble in water, which is an environmentally safe solvent with the ability to cleanly generate indium oxide particles at reasonably low temperatures for example less than 500° C. Indium acetate offers the advantage of being relatively inexpensive and safe to handle, contains little or no carbon, and has existing indium-oxygen bonds.

Verification of the new acetate dihydroxy indium specie can be accomplished using commercial indium acetate recrystallized from water and analyzed. Indium acetate is first dissolved in water which is the solvent that is then reduced in vacuo while a white crystalline solid is precipitated. This solid is then filtered, dried, and subjected to thermogravimetric and infrared spectroscopic analysis. Comparison of the infrared spectrum of the precipitated product with the spectrum of commercial indium acetate indicates that a new acetate dihydroxy indium specie is formed upon reaction of indium acetate with water. The precipitated product exhibits a significantly stronger absorption in the —OH region of the infrared spectrum than commercial indium acetate, as well as new absorbencies in a unique fingerprint region of the spectrum. Solid state pyrolysis of the precipitated product is also consistent with the formation of the new acetate dihydroxy indium specie. Thermogravimetric analysis of the precipitated indium species showed a total mass loss upon pyrolysis of only 33.2%, compared with a mass loss of 67% for the solid state pyrolysis of indium (III) acetate. The pyrolysis product for the white precipitate was found to be pure indium oxide by x-ray diffraction and infrared spectroscopic analysis. This mass loss for the white precipitate is consistent with the acetate dihydroxy indium (III) precursor structure. Such a new species is formed via hydrolysis of the indium acetate precursor, $In(OOCCH_3)_3+2H_2O$ to produce $(CH_3COO)In(OH)_2+2CH_3COOH$. This new species likely exists as an extended polymer in the solid state, with a structure analogous to that of acetate dimethyl indium (III).

Any suitable aerosol pyrolysis apparatus, not shown, may be used to employ the aerosol pyrolysis method to generate micrometer-sized indium oxide particles. Preferably, a piezoelectric transducer may be used to cavitate a water solution of indium acetate and generate the aerosol droplets. A spinning cone may be used as well. These droplets are passed, preferably using a carrier gas, which may be, for example, a flow of air, to and through a tube furnace where pyrolysis takes place. The particles may be collected at an exit port of the tube furnace. A variety of collection methods are possible, but cold-trapping of the tube furnace effluent is preferred because of its simplicity and effectiveness. Alternatively, electrostatic collection or filter collection may be used. The water vapor and product particles exiting the tube furnace are condensed together by cold trapping and then separated preferably by centrifugation.

The tube furnace may have temperatures of 650–700° C. The indium oxide is an off-white powder collected from the aerosol pyrolysis apparatus. Scanning electron microscopy may be used to confirm that the powder consists of spherical, hollow particles, approximately 0.5–2.0 um in diameter. The droplet size may be adjusted to provide the desired particle size. A portion of these spheres may be imploded. Despite the somewhat irregular shape of the partially imploded microspheres, the particles do not tend to agglomerate as does commercially available indium oxide powder. X-ray diffraction analysis of the collected powder may also be used to confirm the indium oxide content. The improved non-agglomerated small size indium oxide particles may then be suspended into a polymer matrix. The powder of particles may be stirred into a soluble prepolymer which is then spun onto a desired surface, and then cured providing the antistatic coating.

The aerosol pyrolysis apparatus is of conventional design and those skilled in the art can readily configure a suitable pyrolysis system. Indium acetate, the desired precursor, is commercially available. The apparatus produces hollow spheres of micron and sub-micron size indium oxide particles well suited for polymer loading and subsequent coating. While the above method may be improved and enhanced, those improvements and enhancements may nonetheless fall within the spirit and scope of the following claims.

What is claimed is:

1. A method for generating micron-sized microsphere particles of indium oxide, said method comprises the steps of dissolving indium acetate in water to form a solution comprising a precursor of acetate dihydroxy indium and water, generating an aerosol of droplets from said solution, heating said droplets to produce said particles while evaporating said water of said droplets, said particles are non-agglomerated particles.

2. The method of claim 1 wherein said generating step, a piezo electronic vibrator vibrates said solution into said aerosol.

3. The method of claim 1 wherein said generating step, a spinning cone spins said solution into said aerosol.

4. The method of claim 1 further comprising the step of transporting said aerosol by a carrier gas for subsequent heating.

5. The method of claim 4 wherein said carrier gas is air containing oxygen for burning said droplets to form said particles.

6. The method of claim 1 wherein the heating step forms evaporated water from said water, the method further comprising the steps of, transporting said aerosol by air for subsequent heating, said air contains oxygen for burning said droplets to form said particles, cold trapping said evaporated water and said particles after heating said solution to condense said evaporated water back into said water, and centrifuging said water and said particles to separate said water and said particles from each other.

7. The method of claim 1 wherein said heating step, said droplets are burned at a pyrolysis temperature of 650–700° C. forming said particles to have a diameter of less than two microns.

8. A method for generating an antistatic polymer matrix, said method comprises the steps of dissolving indium acetate in water to form a solution comprising acetate dihydroxy indium and water, generating an aerosol of droplets from said solution, heating said droplets to produce non-agglomerated microsphere particles having a diameter of less than 2.0 microns while evaporating said water, loading a prepolymer with said particles, and curing said prepolymer to form said antistatic polymer matrix.

9. The method of claim 8 wherein said prepolymer is uncured polyimide.

10. A method for forming an antistatic coating on a surface, said method comprises the steps of dissolving indium acetate in water to form a solution comprising acetate dihydroxy indium, generating an aerosol of droplets from said solution, heating said droplets to produce non-agglomerated microsphere particles having a diameter of less than 2.0 microns while evaporating said water in said droplets, loading a prepolymer matrix with said particles, applying said loaded prepolymer matrix to said surface, and curing said loaded prepolymer matrix to produce said antistatic coating on said surface.

* * * * *